Nov. 7, 1944.  T. N. ROSSER ET AL  2,362,028
VIBRATOR POWER SUPPLY SYSTEM
Filed Oct. 23, 1942
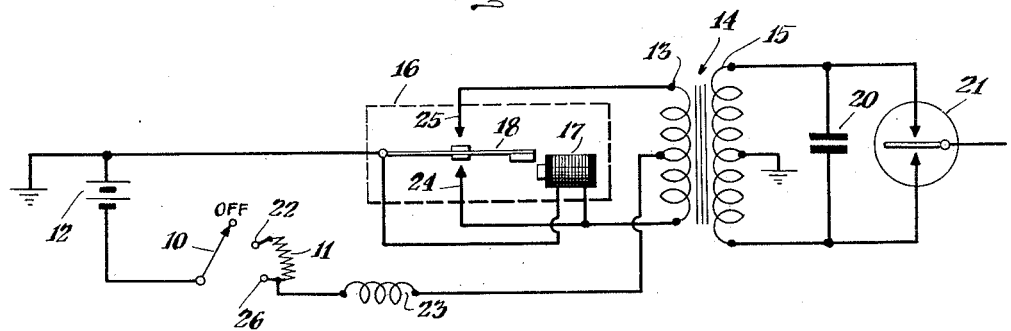
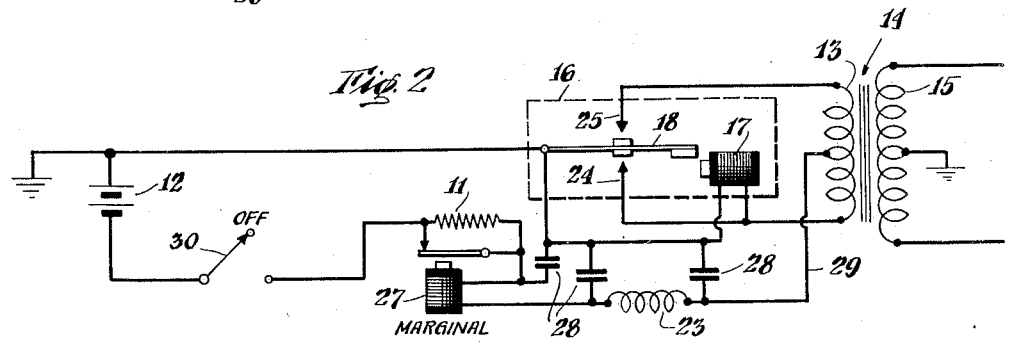
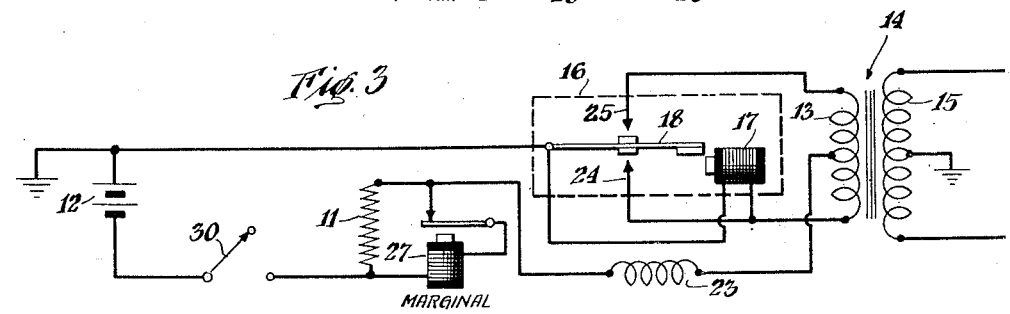
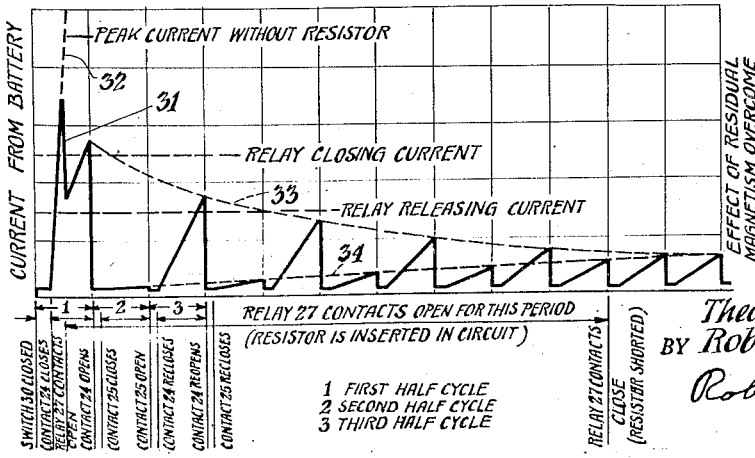
INVENTORS
Theodore N. Rosser
BY Robert J. Hust
Robbin + Carlson
ATTORNEYS Patented Nov. 7, 1944

2,362,028

UNITED STATES PATENT OFFICE 2,362,028

VIBRATOR POWER SUPPLY SYSTEM

Theodore N. Rosser and Robert J. Aust, Indianapolis, Ind., assignors to P. R. Mallory & Co., Inc., Indianapolis, Ind., a corporation of Delaware Application October 23, 1942, Serial No 463,098

9 Claims. (Cl. 171—97)

This invention relates to vibrator power supply systems.

An object of the invention is to improve vibrator systems, particularly the starting thereof.

A further object is to improve the means for protecting the vibrator contacts of a vibrator power supply system.

Other objects of the invention will be apparent from the description and claims.

In the drawings:

Figure 1 is a circuit diagram of a vibrator power supply system embodying one form of the present invention;

Figure 2 illustrates a further improved system;

Figure 3 shows a further modification; and

Figure 4 is a graphic chart illustrating a time sequence employed in starting the vibrator.

Vibrator systems are utilized to convert electric energy from a relatively low voltage source to a higher voltage, such as may be required, for example, for plate and bias purposes in a radio set. A vibrator system normally comprises a step-up transformer having a dual primary circuit, including the low voltage source and a vibrator to alternate the current through the transformer primary winding. Where a direct current voltage is required in the output, as is usually the case, rectifying means are connected in the output circuit. This may comprise a vacuum tube rectifier or rectifying contacts on the vibrator.

Since the vibrator is required to interrupt a circuit having a high inductance, it is subject to the possibility of severe destructive arcing at its contacts. For steady operation this can be kept at a minimum by judicious design of the transformer and by the insertion of suitable buffer condensers bridged across the transformer windings. However, during the starting cycles of the vibrator, and particularly during its first half cycle of operation, unusual arcing conditions are encountered which cannot be overcome by the same circuit elements which control the arcing during steady operation.

When the starting switch is closed to connect the battery or other source to the vibrator and transformer primary winding, the vibrator magnet is first energized to start the swing of the vibrator reed. As soon as the reed has swung far enough to close one pair of the vibrator contacts, a low resistance circuit is established through half of the transformer winding. Current from the battery immediately begins to build up in this circuit. Since the resistance of the circuit is low, the rate of current increase is controlled principally by the back E. M. F. developed in the half transformer winding by the change of magnetic flux in the core.

During steady operation of the vibrator the magnetic flux will be reversed in direction during each vibrator half cycle. It will be apparent, therefore, that if the system is designed so that the transformer will have a maximum flux of $F_m$ at the end of each half cycle period, the total change in flux during a half cycle will be from $-F_m$ to $+F_m$, or $2F_m$.

During the starting half cycle, however, the flux at the start will be determined by the residual magnetism in the iron core of the transformer. In many cases this may amount to as much as $.8F_m$ and may be in the same direction as the initial magnetizing impulse. It will be evident, therefore, that, disregarding saturation conditions of the iron core, the current which builds up through the transformer winding during the first half cycle will create a flux which may be additive to the residual magnetism of the core to produce a total flux of $2.8F_m$ in the transformer by the end of the first half cycle when the vibrator contacts open.

In a practical design, saturation of the core may occur before this flux density is reached, in which case the current through the primary winding will increase to excessively high values. Therefore, at the end of the first half cycle of operation when the first pair of vibrator contacts open, a much higher current will be flowing in the primary winding than is attained during steady operation and the flux will also be much greater than $F_m$. This condition of excessive current and excessive flux density imposes severe arcing conditions on the vibrator contacts as they open, which cannot be fully controlled by the buffer condensers connected in the circuit, without damaging results during the steady-state operation.

Heretofore, such conditions have been kept under control as much as possible by reaching a compromise in the design of the transformer to reduce the severe arcing conditions on starting, but this also reduces the efficiency of the transformer during steady operation. Such expedients have not been able to entirely eliminate the trouble and where batteries of higher than six volts are used, such as in aircraft electric systems (which may have a voltage of fourteen to twenty-eight volts), the problem is particularly serious.

The present invention contemplates an improvement in the vibrator system involving the use of a limiting resistance to limit the current during the initial cycles of vibrator operation.

Referring to the drawing, Figure 1 illustrates the simplest embodiment of the invention which utilizes a three position starting switch 10 for introducing a limiting resistance 11 into the circuit on starting and subsequently removing it by further rotation of the switch. The transformer primary circuit includes low voltage battery 12, center-tapped primary winding 13 of transformer 14, and vibrator 16 having an electromagnet 17 controlling vibratory reed 18. A buffer (or timing) condenser 20 is bridged across the center-tapped secondary winding 15 of the transformer. A full wave rectifier 21 is connected in the secondary circuit to rectify the output current. This rectifier may be an electronic device or may comprise rectifying contacts on vibrator 16. Where an A. C. output is desired, the rectifier will, of course, be omitted. Vibrator 16 may be of a type well known in the art such as those illustrated in U. S. Patents 2,187,950, 2,190,685 or 2,197,607.

To start the operation of the circuit shown in Figure 1, switch arm 10 is moved to first engage contact 22, thereby closing a circuit from battery 12 through resistance 11, radio frequency choke coil 23, the lower half of transformer primary winding 13, vibrator electromagnet 17 back to battery 12. This energized electromagnet 17 which draws reed 18 toward it until the reed contact engages side contact 24 of the vibrator to establish a short circuit on magnet coil 17. Since magnet 17 has a high resistance winding the initial current flow is very small, but upon closure of contact 24 this resistance is removed from the circuit permitting current to build up in the lower half of primary 13 limited by the back E. M. F. of the winding and the resistance 11 in the circuit.

If it were not for resistance 11 in the circuit at this time, the current build-up would tend to become excessive, as previously pointed out, so that at the end of the first half cycle, when the vibrator reed 18 begins to swing back toward center position, due to de-energization of magnet 17, and opens contact 24, severe arcing would take place at the vibrator contacts as they open. However, because of the presence of resistance 11 in the circuit, a voltage-drop occurs across it, reducing the applied voltage to the transformer. This is sufficient to permit a satisfactory value of counter E. M. F. and flux-density to operate, thus limiting the current commutated by the contacts upon opening, and preventing arcing. This reversal of the direction of current in the primary results in a reversal of magnetic flux and counter E. M. F. In this second half-cycle, the flux generated is now opposing the original excessive flux and reducing the unbalance caused by the original residual magnetism. The result is a shift of the mid-point of the flux wave toward zero, which is the steady-state condition. The magnetizing current required in this second half-cycle is very small since the flux required is small although the change in flux is the same as before.

The third half-cycle finds an increase in the value of magnetizing current, but this time it does not reach the value of the first half-cycle, since the maximum flux required has now been lowered by the shift of the mid-point of the flux-wave. The fourth half-cycle finds an increase while the fifth shows a further decrease. This continues until the successive half-cycles are equalized, which is the steady-state condition.

Switch arm 10 can be moved to engage contact 26, thus removing resistance 11 from the circuit, at any time after the completion of approximately 10 to 20 half-cycles. Since the time between initial closing of the circuit and the completion of the first 10 to 20 half-cycles is very short, usually in the order of $\frac{1}{25}$ to $\frac{1}{10}$ of 1 second, sufficient time delay will ordinarily be provided in the normal mechanical movement of the switch from "off" position to contact 22 and then to contact 26. Switch 10 may be of the type normally used in radio sets, such as that shown in U. S. Patent 2,177,483 for example.

Figure 2 shows an improvement on the circuit of Figure 1 wherein the introduction of resistance 11 into the circuit is controlled by a marginal relay 27. This relay will operate when excessive current is drawn from the battery but will not operate on the normal current drawn during steady operation of the system. This system has the advantage of automatic operation, more accurate timing, and protection of the circuit in case of failure during operation, as well as other advantages which will appear more fully hereafter.

In operation of the circuit of Figure 2 the circuit is energized by closing switch 30, thereby closing the circuit from battery 12 through switch 30, contacts of relay 27, winding of relay 27, radio frequency choke 23, lower half of winding 13, vibrator magnet 17 back to battery 12. Magnet 17 on being energized starts the vibration of reed 18 closing contacts 24 which permits the current to rapidly increase therein. This increase in current (if excessive) energizes relay 27 causing it to open its contacts and introduce resistance 11 in series with the circuit to thereby limit the maximum value of the current. Contact 24 and its cooperating reed contact are thereby protected from excessive currents when they open. At the end of the first half cycle relay 27 begins to release. However, the inertia of the relay armature and other factors in the relay design delay the closing of the relay contacts for several cycles thus allowing elimination of most of the residual magnetism in the transformer core before resistance 11 is removed from the circuit.

Relay 27 also serves, together with condensers 28, as a part of a radio frequency "hash" or interference filter to keep such interference as is generated by the vibrator circuit out of the battery circuit.

Figure 4 is a graphic representation of the sequence of operation of the various contacts in the system shown in Figure 2. Curve 31 represents the current in conductor 29 during various parts of the starting cycle. It will be noted that when the switch 30 is first closed, the current is limited to a small value by high resistance vibrator magnet winding 17, but that it increases rapidly to a high value as soon as vibrator contact 24 is closed. This causes relay 27 to operate, sharply reducing the current by introduction of resistor 11 into the circuit. If it were not for introduction of resistor 11 the current would rise to excessively high values as shown by dotted curve 32.

When the resistor has been introduced, the current may rise somewhat in a less rapid manner until vibrator contact 24 is opened by the return swing of the reed, again reducing the current to the small value of the magnetizing current for vibrator magnet 17. When the reed closes contact 25 on the second half of the first cycle of vibrator operation, the current is held to a low value since it has to overcome the residual magnetism of the transformer. On succeeding alternate half cycles the current pulses aiding and opposing the effect of residual magnetism decrease and increase respectively until they become about equal when most of the residual magnetism has been removed as indicated by envelope curves 33 and 34. The contacts of relay 27 then close (after 10 to 20 cycles) to remove resistor 11 from the circuit. The removal of the resistor at this time has little effect upon the current.

Figure 3 shows a modification of the circuit of Figure 2 wherein resistance 11 is in shunt with both the contacts and the winding of relay 27 rather than the contacts alone. When excessive currents are encountered relay 27 opens its own circuit momentarily, to introduce resistance 11 in series with the vibrator circuit during the short time necessary for protection on starting. The current drawn during steady operation is not sufficient to operate the relay.

The present invention makes it possible to utilize a more efficient transformer since it may be designed to have the optimum characteristics for steady operation. Such an improved transformer may be smaller and have lower leakage inductance and distributed capacitance between the primary and secondary windings which also reduce the burden on the vibrator contacts during steady operation. It may not be necessary to use a primary buffer condenser, or if one is used it may be smaller than would otherwise be required.

Another advantage of the relay 27 is its use as a radio frequency filter choke to eliminate interference in the battery circuit, thus providing a comparatively high inductance choke coil with low resistance. While specific embodiments of the invention have been described, it is intended to cover the invention broadly within the spirit and scope of the appended claims.

What is claimed is:

1. A vibrator power supply system wherein a current source in the primary circuit of a transformer supplies electric current to the midpoint of the primary winding of said transformer and a vibratory interrupter in said circuit driven by said source independently of the load current in said primary alternately closes the circuit through the two halves of said primary to thereby generate an alternating voltage across the secondary winding of said transformer and a switch under control of an operator is located in said primary circuit for controlling the energization of said circuit, characterized by the fact that there is combined with said primary circuit a current limiting resistance and switching contacts for effectively introducing said resistance in said primary circuit when said switch is actuated to energize said circuit.

2. A vibrator power supply system wherein a current source in the primary circuit of a transformer supplies electric current to the mid-point of the primary winding of said transformer and a vibratory interrupter in said circuit driven by said source independently of the load current in said primary alternately closes the circuit through the two halves of said primary to thereby generate an alternating voltage across the secondary winding of said transformer and a switch under control of an operator is located in said primary circuit for controlling the energization of said circuit, characterized by the fact that there is combined with said primary circuit a current limiting resistance and switching contacts for effectively introducing said resistance in said primary circuit when said switch is actuated to energize said circuit and for subsequently effectively removing said resistance from said circuit.

3. A vibrator power supply system wherein a current source in the primary circuit of a transformer supplies electric current to the mid-point of the primary winding of said transformer and a vibratory interrupter in said circuit driven by said source independently of the load current in said primary alternately closes the circuit through the two halves of said primary to thereby generate an alternating voltage across the secondary winding of said transformer and a switch under control of an operator is located in said primary circuit for controlling the energization of said circuit, characterized by the fact that there is combined with said primary circuit a current limiting resistance and switching contacts for effectively introducing said resistance in said primary circuit when said switch is actuated to energize said circuit and for subsequently effectively removing said resistance from said circuit after completion of a plurality of interruptions of said electric current by said vibratory interrupter.

4. A vibrator power supply system wherein a current source in the primary circuit of a transformer supplies electric current to the mid-point of the primary winding of said transformer and a vibratory interrupter in said circuit driven by said source independently of the load current in said primary alternately closes the circuit through the two halves of said primary to thereby generate an alternating voltage across the secondary winding of said transformer and a switch under control of an operator is located in said primary circuit for controlling the energization of said circuit, characterized by the fact that there is combined with said switch a current limiting resistance and a switch contact engaged during the movement of said switch between "off" and "on" position to energize said primary circuit through said resistance prior to direct energization thereof from said current source.

5. A vibrator power supply system wherein a current source in the primary circuit of a transformer supplies electric current to the mid-point of the primary winding of said transformer and a vibratory interrupter in said circuit driven by said source independently of the load current in said primary alternately closes the circuit through the two halves of said primary to thereby generate an alternating voltage across the secondary winding of said transformer and a switch under control of an operator is located in said primary circuit for controlling the energization of said circuit, characterized by the fact that there is combined with said primary circuit a current limiting resistance and a marginal relay energized by excessive current in said circuit to effectively introduce said resistance in said circuit and to effectively remove said resistance after cessation of said excessive currents.

6. A vibrator power supply system comprising a source of electric current, a transformer having a center-tapped primary winding and an electromagnetic vibratory interrupter having a vibratory contact connected to one terminal of said source and a pair of stationary contacts alternately engaged by said vibratory contact during vibration thereof and respectively connected to the ends of said primary winding, the center of said winding being connected to the other terminal of said source, a three position switch connected in series with said source, a current limiting resistance connected to terminals of said switch, said switch having an "off" position wherein the circuit through said switch is open, an "on" position wherein the circuit through said switch is closed and a starting position wherein the circuit through said switch is closed through said resistance, said switch passing through said starting position during its travel from "off" to "on" position.

7. A vibrator power supply system comprising a source of electric current, a transformer having a center-tapped primary winding and an electromagnetic vibratory interrupter having a vibratory contact connected to one terminal of said source and a pair of stationary contacts alternately engaged by said vibratory contact during vibration thereof and respectively connected to the ends of said primary winding, the center of said winding being connected to the other terminal of said source, a switch in series with said source, a resistance, and a marginal relay in series with said source for effectively introducing said resistance in series therewith responsive to excessive currents therethrough and for effectively removing said resistance from the circuit upon cessation of said excessive currents.

8. A vibrator power supply system comprising a source of electric current, a transformer having a center-tapped primary winding and an electromagnetic vibratory interrupter having a vibratory contact connected to one terminal of said source and a pair of stationary contacts alternately engaged by said vibratory contact during vibration thereof and respectively connected to the ends of said primary winding, the center of said winding being connected to the other terminal of said source, a switch in series with said source, a resistance in series with said source and a marginal relay in series with said source and having normally-closed contacts in shunt with said resistance.

9. A vibrator power supply system comprising a source of electric current, a transformer having a center-tapped primary winding and an electromagnetic vibratory interrupter having a vibratory contact connected to one terminal of said source and a pair of stationary contacts alternately engaged by said vibratory contact during vibration thereof and respectively connected to the ends of said primary winding, the center of said winding being connected to the other terminal of said source, a switch in series with said source, a resistance in series with said source and a marginal relay having normally-closed contacts in series with its winding, said series arrangement of relay winding and contacts being in shunt with said resistance.

THEODORE N. ROSSER.
ROBERT J. AUST.